US009550102B1

(12) United States Patent
George et al.

(10) Patent No.: US 9,550,102 B1
(45) Date of Patent: Jan. 24, 2017

(54) SYSTEM, METHOD AND APPARATUS FOR TRAINING PROPER TACKLING TECHNIQUE

(71) Applicant: Tackle Tech, LLC, Chattanooga, TN (US)

(72) Inventors: Dillon George, Ooltewah, TN (US); J Raschke, Ooltewah, TN (US)

(73) Assignee: Tackle Tech, LLC, Chattanooga, TN (US)

( * ) Notice: Subject to any disclaimer, the term of this patent is extended or adjusted under 35 U.S.C. 154(b) by 0 days.

(21) Appl. No.: 14/743,230

(22) Filed: Jun. 18, 2015

(51) Int. Cl.
*A63B 69/34* (2006.01)
*A63B 69/00* (2006.01)

(52) U.S. Cl.
CPC ......... *A63B 69/0075* (2013.01); *A63B 69/345* (2013.01); *A63B 2208/0204* (2013.01)

(58) Field of Classification Search
CPC ..................................................... A63B 69/34
See application file for complete search history.

(56) References Cited

U.S. PATENT DOCUMENTS

| | | | | |
|---|---|---|---|---|
| 2,749,121 A * | 6/1956 | Myers | ............... | A63B 69/345 473/443 |
| 3,105,686 A * | 10/1963 | Elsea | ............... | A63B 69/0075 235/61 PE |
| 4,537,397 A * | 8/1985 | Kopp | ............... | A63B 69/0075 473/420 |
| 4,634,122 A * | 1/1987 | Kline | ............... | A63B 69/0075 473/419 |
| 4,655,453 A * | 4/1987 | Spiegel | ............... | A63B 69/0075 473/420 |
| 5,980,398 A * | 11/1999 | Shingleton | ............... | A63B 69/345 473/442 |
| 5,984,809 A * | 11/1999 | Hadar | ............... | A63B 69/345 473/444 |
| 6,261,195 B1 * | 7/2001 | Shingleton | ............... | A63B 69/345 473/438 |
| 6,309,316 B1 * | 10/2001 | Spiegel | ............... | A63B 69/0075 473/420 |

(Continued)

*Primary Examiner* — Michael Dennis
*Assistant Examiner* — Dolores Collins
(74) *Attorney, Agent, or Firm* — Baker, Donelson, Bearman, Caldwell

(57) ABSTRACT

A system includes a tackle training apparatus that comprises a cylindrical structure. The cylindrical structure comprises at least one recessed portion in a curved surface of the cylindrical surface. Each recessed portion of the at least one recessed portion corresponds to a security strap. The system comprises placing a first flat surface of the cylindrical structure on a playing surface of a practice field, wherein the cylindrical structure stands upright upon the playing surface. The system comprises placing a ball in a recessed portion of at the least one recessed portion, wherein the recessed portion and a corresponding securing strap secure the ball to the tackle training apparatus. The system includes a player approaching the cylindrical structure in a tackling disposition, wherein the player targets the ball with a facemask portion of a helmet worn by the player. The system comprises striking the ball and the cylindrical structure with the facemask of the user's helmet, the striking including dislodging the ball from the cylindrical structure.

6 Claims, 5 Drawing Sheets

(56) References Cited

U.S. PATENT DOCUMENTS

| | | | |
|---|---|---|---|
| 6,824,504 B2 * | 11/2004 | Ott | A63B 21/072 |
| | | | 473/438 |
| 6,942,585 B1 * | 9/2005 | Krause | A63B 69/002 |
| | | | 473/441 |
| 7,056,238 B1 * | 6/2006 | Brown | A63B 69/345 |
| | | | 473/422 |
| 7,794,337 B2 * | 9/2010 | Gamboa | A63B 69/345 |
| | | | 473/438 |
| 7,959,528 B1 * | 6/2011 | Wilkes | A63B 69/0002 |
| | | | 473/451 |
| 8,262,514 B2 * | 9/2012 | Spiegel | A63B 69/0075 |
| | | | 473/419 |
| 8,960,678 B2 * | 2/2015 | Gilman | A63B 69/345 |
| | | | 273/445 |
| D731,012 S * | 6/2015 | Gilman | D21/635 |
| 9,126,089 B2 * | 9/2015 | Spiegel | A63B 69/0075 |
| 2004/0132557 A1 * | 7/2004 | Broglio | A63B 69/0002 |
| | | | 473/422 |
| 2006/0035734 A1 * | 2/2006 | Borunda | A63B 71/06 |
| | | | 473/445 |
| 2006/0100040 A1 * | 5/2006 | Spencer | A63B 21/0058 |
| | | | 473/441 |

* cited by examiner

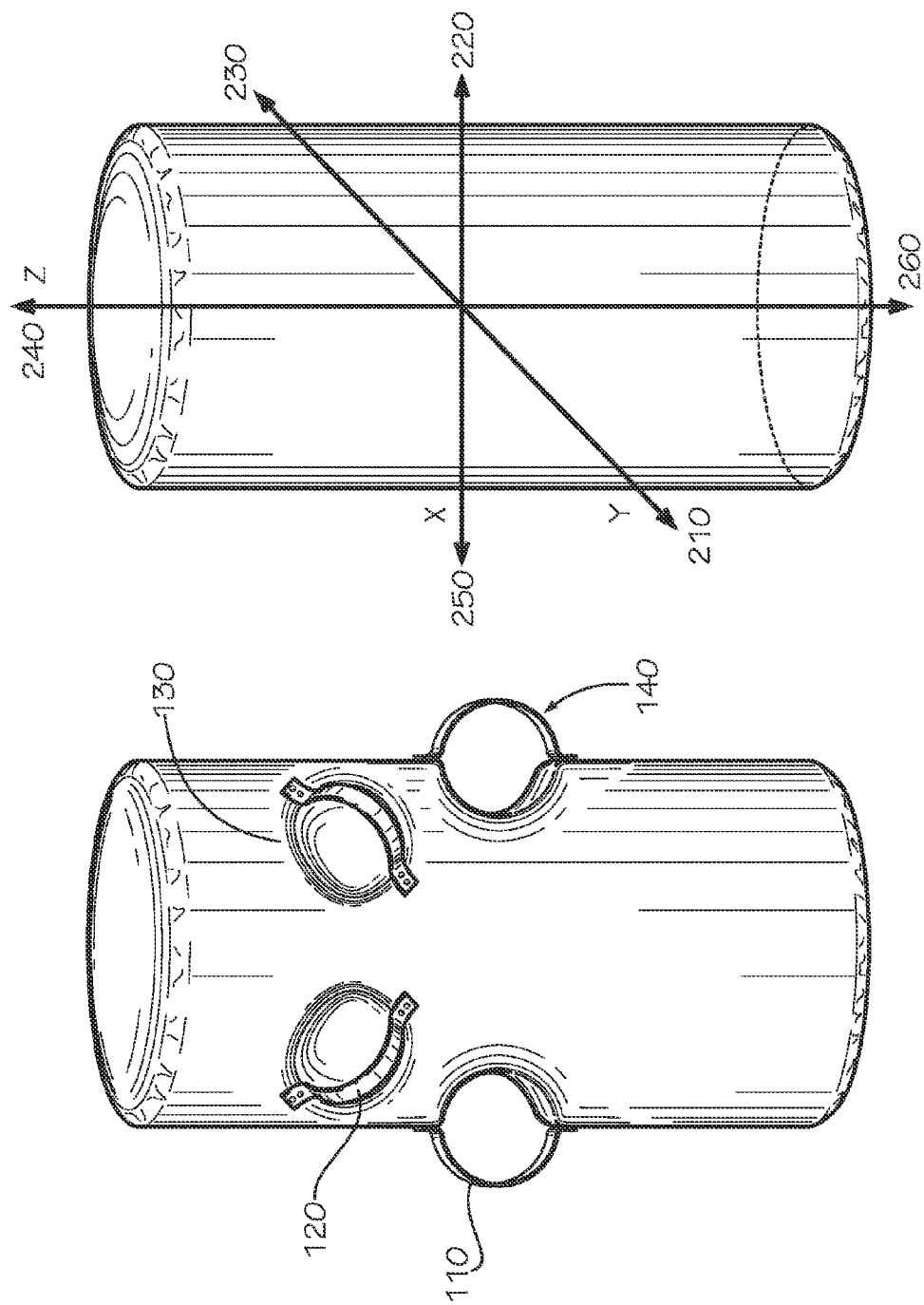

SYSTEM, METHOD AND APPARATUS FOR TRAINING PROPER TACKLING TECHNIQUE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

Tackle dummies have long been used in the American sport of football to teach football players the art of tackling. The dummy represents an opposing player or ball carrier. During practice sessions, a player or tackler practices tackling techniques by rushing and striking the dummy to simulate physical contact with a ball carrier. There is a need to provide a tackle dummy which teaches tackling techniques that avoid the head and neck area of a ball carrier.

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

So that the manner in which the present application can be better understood, certain illustrations and figures are appended hereto. It is to be noted, however, that the drawings illustrate only selected embodiments and elements of a tackle dummy as disclosed herein and are therefore not to be considered limiting in scope for the tackle dummy as described herein may admit to other equally effective embodiments and applications.

FIG. 1 is a front view of the training apparatus with side and front indentations, under an embodiment.

FIG. 2 is a perspective view of the training apparatus oriented using a three dimensional coordinate system, under an embodiment.

DETAILED DESCRIPTION

Figure 4:
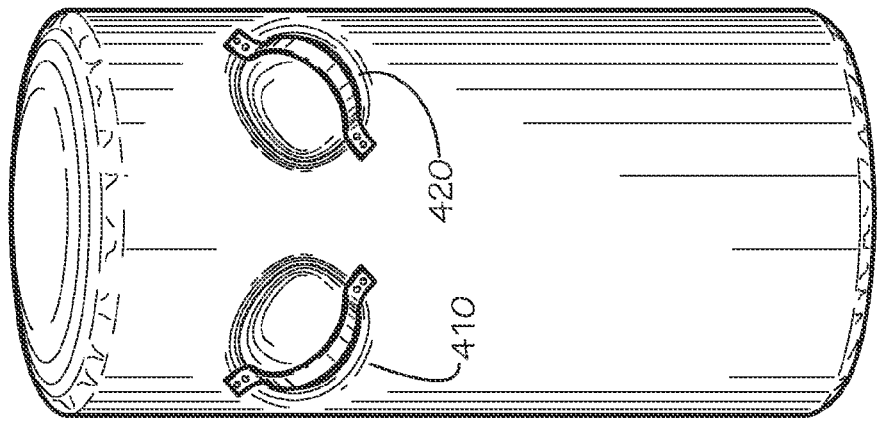
FIG. 4 is a front view of the training apparatus with front indentations only under an embodiment.

There is increasing controversy regarding the long-term damage of repeated concussions among National Football League (NFL) players. Concussions and other types of play-related traumatic brain injuries have been proposed as a major cause of adverse conditions after retirement, including memory loss, depression and chronic traumatic encephalopathy (CTE). Similar debate and controversy over concussions and associated long term symptoms and conditions exist at the collegiate level. The problem also concerns youth athletic organizations due to the popularity of football among youth athletes.

Concussions arise from an abrupt redirection of the human body or the sudden impedance of a human body in motion. In the game of football, it can be caused either by a direct blow to the head, or an indirect blow to the body. A bump, blow, or jolt to the head can cause a concussion, a type of traumatic brain injury. Concussions can also occur from a blow to the body that causes the head and brain to move rapidly back and forth. Resulting neurological damage may present temporarily and then quickly resolve. Under another scenario, there may be no immediately detectable neurological damage. However, the concussion may increase the probability of injury from subsequent blows and collisions.

The training apparatus provides an excellent training tool for teaching proper tackling techniques using a combination of a traditional tackle dummy and strategic placement of a football on the apparatus as further described below.

The concept of the football tackle is simple. One player initiates contact with a ball carrier to prevent the ball carrier's progress and to potentially remove the ball from the carrier's possession. In short, tackle means to forcibly bring a ball carrier to the ground. However, the very act of tackling, i.e. the collision of two moving bodies, presents a risk for concussion. Proper tackling may reduce such risk. In view of this fact, both the NFL and the NCAA have banned improper methods to reduce the occurrence of concussion and to promote player safety in general.

As just one example, the NFL has instituted rules penalizing players for using their helmet to strike defenseless players in the head or neck. As another example, the NCAA prohibits targeting of or initiating contact to the head or neck area of a defenseless opponent with the helmet, forearm, fist, elbow or shoulder. Youth football associations and leagues have adopted similar rules and protections to reduce the risk of head injury.

In view of these rules, coaching methods must promote effective tackling techniques that bring the ball carrier to the ground without directly striking the head and neck area of the carrier. These coaching methods are particularly important in youth athletics. Youth football athletes that learn and adopt proper tackling postures will carry this habit forward into collegiate and potentially professional play. The training apparatus as seen in FIGS. 1-10 provides an excellent training tool for teaching proper tackling techniques using a combination of a traditional tackle dummy and strategic placement of a football on the apparatus as further described below.

FIG. 1 shows a perspective view of a training apparatus under an embodiment. For purposes of orientation, refer to FIG. 2 which superimposes a three dimensional Cartesian coordinate system onto the cylinder like structure of the training apparatus. It is convenient to use this coordinate system to define the front, back, left and right portions of the apparatus. FIG. 2 shows the x, y and z axes of the coordinate system intersecting at the midpoint of the training apparatus's axis, i.e. the axis of the dummy's cylinder like structure. The x and y axes form right angles with the cylinder's axis. The z axis is collinear with the cylinder's axis. Under this coordinate system, we are able to define the front, right, left, and back of the training apparatus. The front side is the portion of the training apparatus visible to a viewer in position 210. The right side is the portion of the training apparatus visible to a viewer in position 220. The back side is the portion of the training apparatus visible to a viewer in position 230. The left side is the portion of the training apparatus visible to a viewer in position 250.

FIG. 1 shows a representative embodiment of the training apparatus. The training apparatus comprises a cylindrical structure which stands upright on football field without further reinforcement. Alternatively, a coach or other party may stand behind the apparatus in position 230 to provide additional reinforcement during practice sessions. The training apparatus may under one embodiment comprise a preformed high density foam core. The exterior sheathing may comprise PVC covering. It is of course understood that the training apparatus may be manufactured using alternative materials and methods. As further indicated below, the training apparatus may comprise various weights and dimensions depending upon the average size of the players using the product during a practice session.

As indicated above, FIG. 1 shows a representative embodiment of the training apparatus. The apparatus represents an opposing football player. As seen in FIG. 1, the apparatus includes strap and indentation configurations. For ease of reference each installation may be referred to as a "strap/indentation" or as a "strap/indentation configuration," "strap/indentation structure," or "strap/indentation formation." Further, each installation may be referred to simply as a configuration, structure or formation. Note that the location of strap/indentations shown in FIGS. 1-10 change according to the size and dimension of the apparatus in order to maintain the same relative locations of strap/indentations as shown in such figures.

Figure 3B:
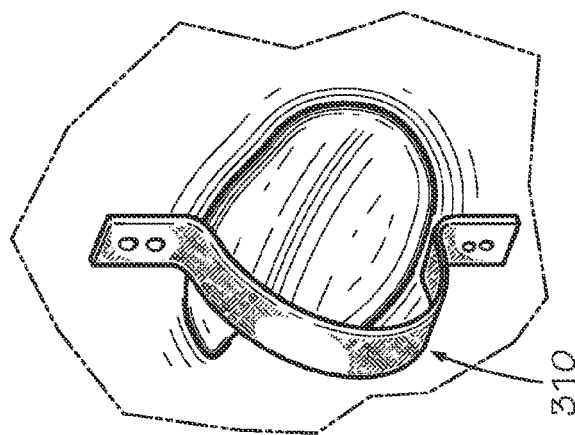
FIG. 3B is a blow up view of the indentation of FIG. 3A under an embodiment.
Figure 10:
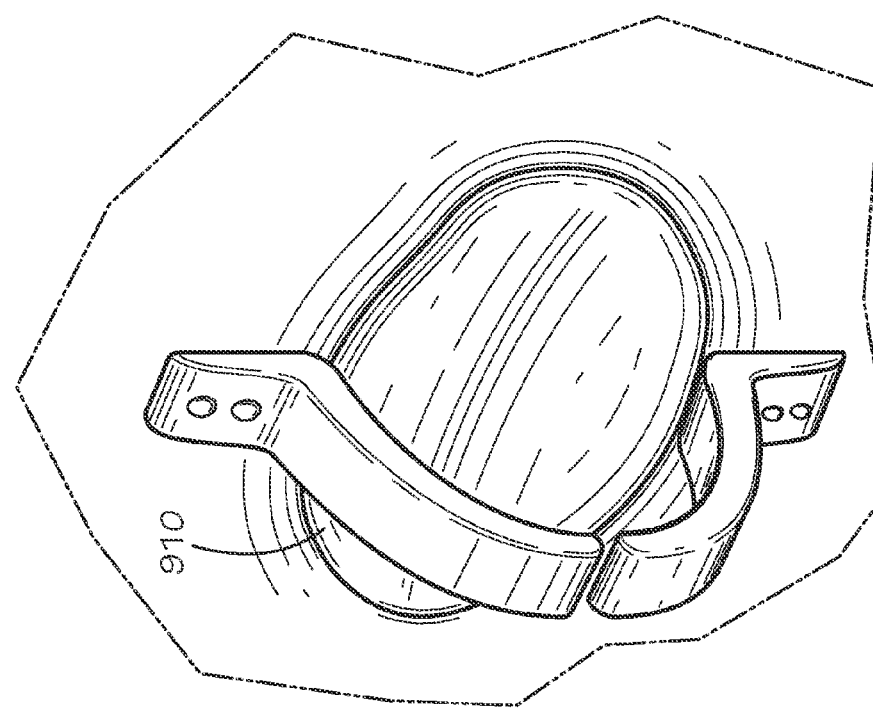
FIG. 10 shows a close up view of the strap shown in FIG. 9 under an embodiment.

Specifically, FIG. 1 shows a strap/indentation 110 on the left side of the apparatus and a strap/indentation 140 on the right side of the apparatus. Further, FIG. 1 discloses strap/indentation formations 120, 130 on the upper left and upper right of the apparatus. With reference to strap/indentation 110 as an example, the formation comprises the combination of a strap and indentation slot at a single location. The slot represents a recessed area on the outer surface of the apparatus. FIG. 3B provides a blow up view of a left side strap/indentation formation 310. Again with reference to strap/indentation 110 of FIG. 1, the recessed area provides under an embodiment a horizontally disposed contour that approximately matches the exterior shape of a football. Accordingly, the recessed area may be approximately 2 inches deep, 3 inches wide, and 4 inches long. The corresponding strap spans the width of the recessed slot at its midpoint and protrudes laterally from the apparatus in a semi-circular configuration (see also FIG. 3B, 310). The indented slot may be formed as part of the apparatus's foam core construction, but embodiments are not so limited. The strap may comprise flexible material. Alternatively, the strap comprises plastic or rubberized cleats or claws which are rigid but flexible as shown in FIG. 10. The straps may be attached to the apparatus in any manner, such as by providing cut-outs in the exterior covering of the apparatus that correspond to the indentation locations.

Figure 7:
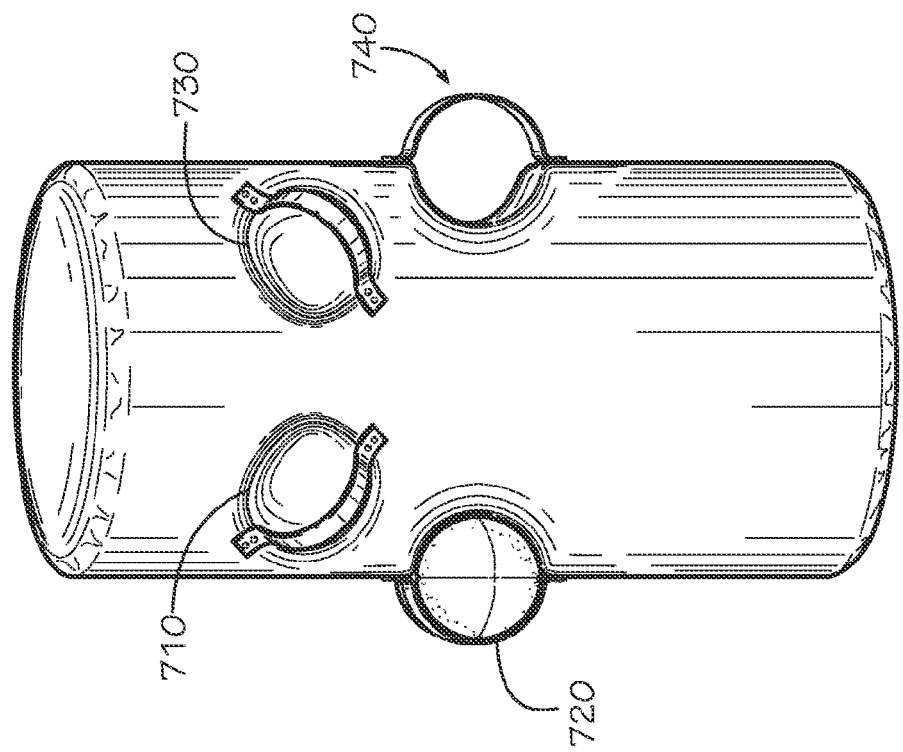
FIG. 7 is a front view of the training apparatus with front and side indentations and football attached to left indentation under an embodiment.

In actual use, a coach may place a football into left side slot/indentation 110 of FIG. 1 by working the ball into the recessed area and underneath the strap. FIG. 7 shows a football installed in slot/indentation 720. As seen in FIG. 7, a surface of the football resides within the slot of slot/indentation 720, and the corresponding strap functions to secure the football in place. Under an alternative embodiment, the slot may frictionally engage the football to provide a strapless press fit.

Figure 5:
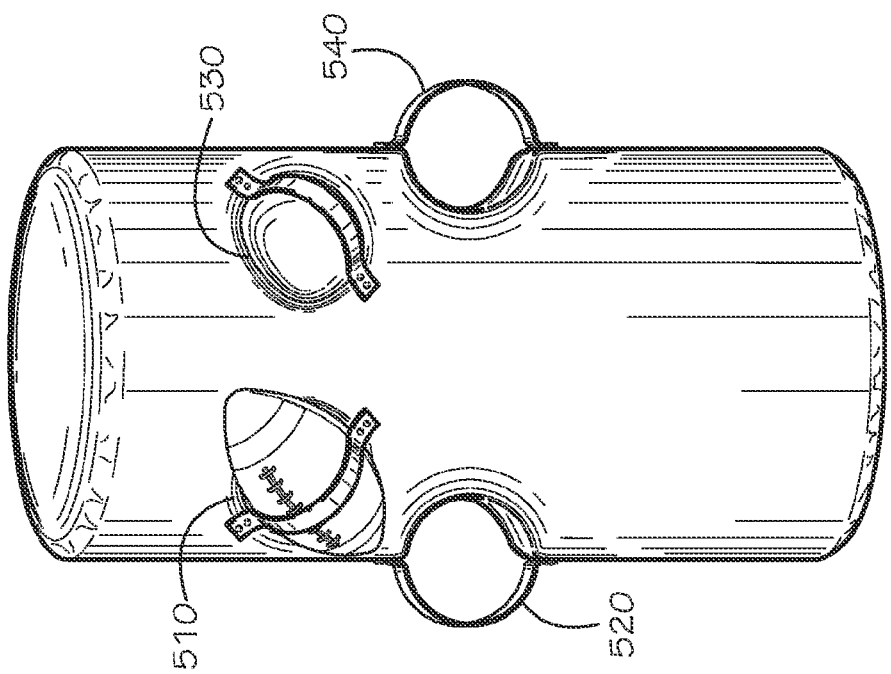
FIG. 5 is a front view of the training apparatus with front and side indentations and football attached to front indentation under an embodiment.

With reference to FIG. 1, the left side slot/indentation 110 is mirrored by an identical opposing slot/indentation 140. Both of these configurations include slots that are horizontally disposed. However, FIG. 1 shows the alternative configurations of strap/indentation 120, 130. For example, slot/indentation 120 is offset from formation 110 by approximately 45 degree. Further, slot/indentation 130 is offset from formation 140 by approximately 45 degrees. Otherwise, the formations 120, 130 provide structure identical to that of formations 110, 140. FIG. 5 shows a football secured within an offset formation 510.

Although an installed football may reside securely in a strap/indentation as seen in FIG. 7, it is clear that the football may be dislodged with the appropriate application of force. In a practice session, a coach may place a football in strap/indentation 720. The position of the ball represents a ball carrier holding the ball tightly against the body at approximately waist level. The player or tackler is then instructed to tackle the apparatus but with the added task of separating the football from the apparatus. Therefore, the player is instructed to tackle the apparatus by targeting the location of the ball with his face mask. This approach necessarily requires the player to tackle "low," i.e. to target the apparatus well below the head and neck region. This approach simultaneously teaches proper tackling while maximizing turnover opportunities.

With reference to FIG. 5, note that the coach may also place the football in slot/indentation 510. This position of the ball represents a ball carrier holding the ball tightly against the body at approximately chest level. The tackler is commissioned with the same task of targeting the location of the ball with his face mask which again necessitates proper tackling below the head and neck region.

The football may be placed in any one or combination of the slot/indentations shown in FIGS. 1-10. Of course it is understood that the training apparatus may be used in connection with other sports. As just one example, the training apparatus may provide slot/indentations that simulate the location of a soccer ball near an opposing player's foot. In a practice session, a coach may place a soccer ball in such indentation and instruct a player to "tackle" the apparatus and dislodge the ball in a take-away maneuver. The player approaches the apparatus and uses his or her foot to target the soccer ball with sufficient velocity to dislodge the ball from the apparatus. The approach forces the player to target the exact location of the ball. Otherwise, the take-away maneuver is unsuccessful. It is understood that the training apparatus as described herein is capable of multiple application across numerous sporting platforms.

As described above, the fundamental idea for the training apparatus is to remove the need for coaching strategy (or error), as it applies to tackling technique. The apparatus itself serves as instruction for proper tackling form through strategic placement of the football that is dislodged through the use of proper tackling technique.

Figure 3A:
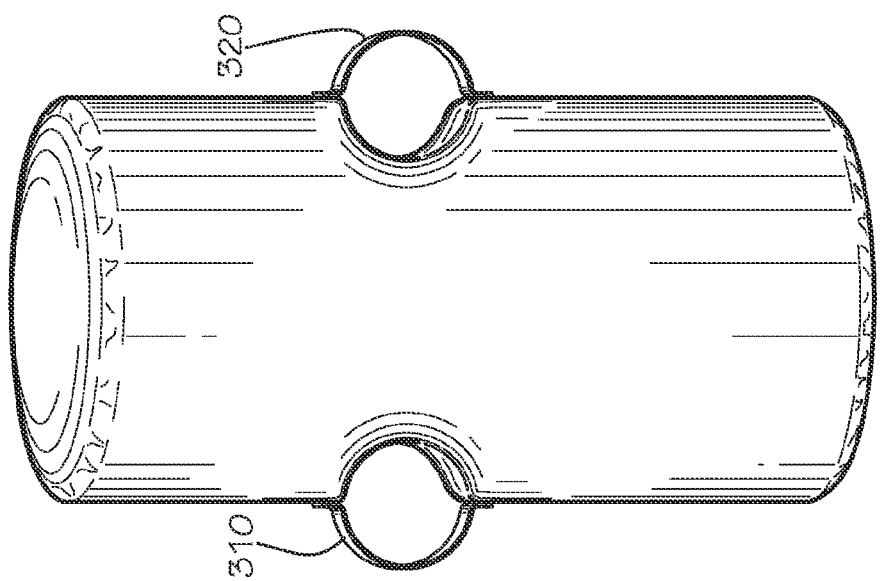
FIG. 3A is a front view of the training apparatus with side indentations only under an embodiment.

The training apparatus includes slot/indentation formations in a variety of locations. FIG. 3A is a front view of the training apparatus with side indentations 310, 320 under an embodiment. FIG. 3B is a blow up view of slot/indentation 310 of FIG. 3A.

FIG. 4 is a front view of the training apparatus with front side offset slot/indentations 410, 420 under an embodiment.

FIG. 5 is a front view of the training apparatus with offset front 510, 530 and side 520, 540 slot/indentations and football attached to front offset slot/indentation 510 under an embodiment.

Figure 6:
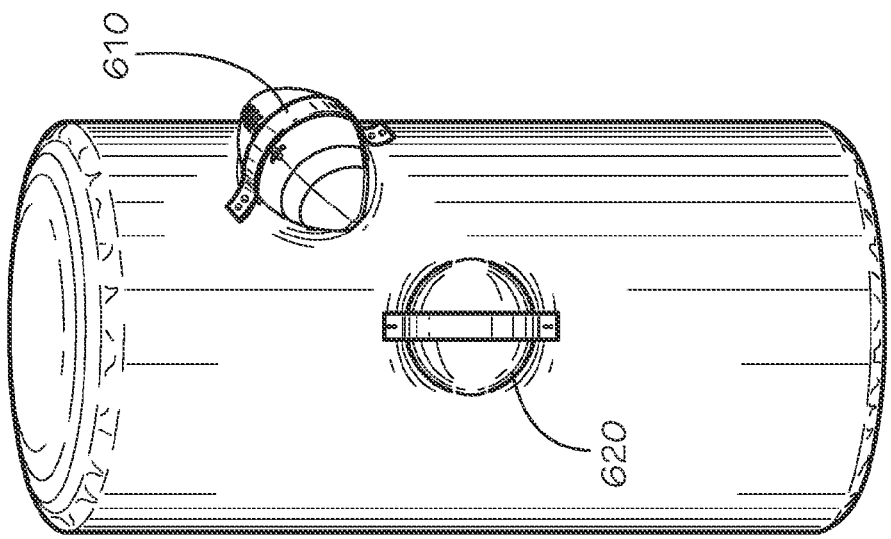
FIG. 6 is a side view of the training apparatus of FIG. 5 under an embodiment.

FIG. 6 is a side view of the training apparatus of FIG. 5 under an embodiment.

FIG. 7 is a front view of the training apparatus with offset front 710, 730 and side 720, 740 slot/indentations and football attached to left side slot/indentation 720 under an embodiment.

Figure 8:
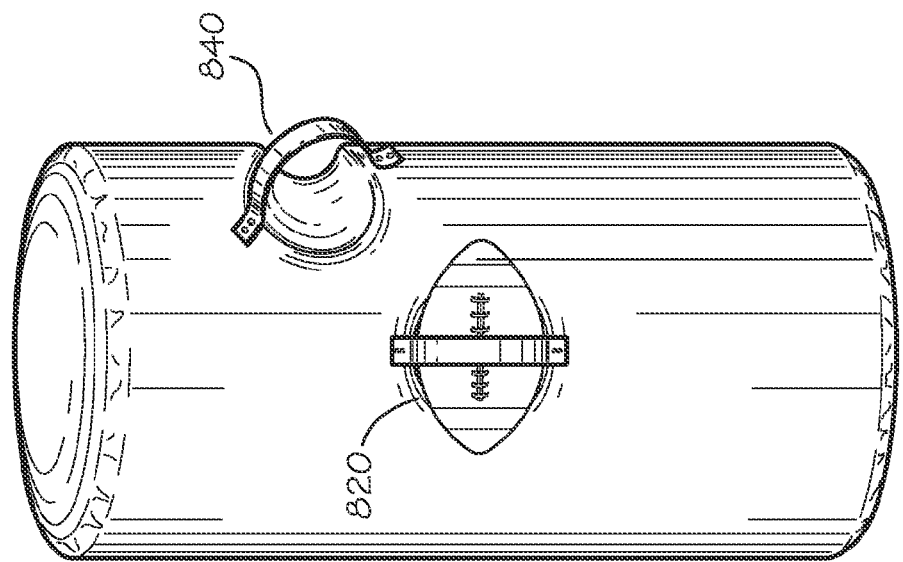
FIG. 8 is a side view of the training apparatus of FIG. 7 under an embodiment.

FIG. 8 is a side view of the training apparatus of FIG. 7 under an embodiment.

Figure 9:
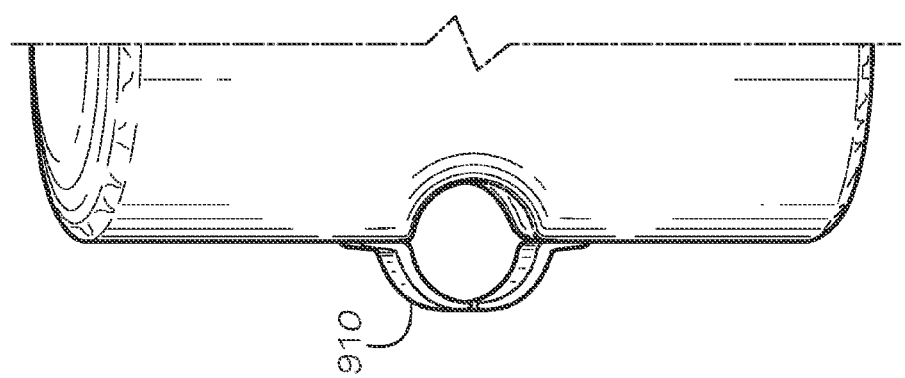
FIG. 9 is a perspective view of a left side indentation under an embodiment.

FIG. 9 is a perspective view of a left side strap/indentation 910 under an embodiment.

FIG. 10 shows a close up view of the strap/indentation 910 shown in FIG. 9 under an embodiment.

It is understood that the tackle training apparatus of FIGS. 1-10 and the system and method for training proper tackling technique are merely illustrative. Other arrangements may be employed in accordance the embodiments set forth below. Further, variations of the training apparatus may comply with the spirit of the embodiments set forth herein.

We claim:

1. An apparatus comprising:
a cylindrical structure, wherein the cylindrical structure comprises at least one recessed portion in a curved surface of the cylindrical surface, wherein each recessed portion of the at least one recessed portion corresponds to a security strap, wherein the at least one recessed portion and corresponding security strap are dimensioned to secure a football to the cylindrical structure in a removably coupled relationship, wherein a contour of the at least one recessed portion corresponds to an exterior surface of the football;
a first flat surface of the cylindrical structure resting upon a playing surface of a practice field, wherein the cylindrical structure stands upright upon the playing surface.

2. The apparatus of claim 1, wherein the at least one recessed portion comprises a length, a width, and a depth.

3. The apparatus of claim 2, wherein the length of the at least one recessed portion is greater than the width and the depth.

4. The apparatus of claim 3, wherein the corresponding strap of the at least one recessed portion spans the width of the at least one recessed portion and protrudes laterally from the cylindrical structure in a semicircular fashion.

5. The apparatus of claim 3, wherein the length is horizontally disposed relative to an axis of the cylindrical structure.

6. The apparatus of claim 3, wherein the length is offset from an axis of the cylindrical structure.

* * * * *